United States Patent
Balopole et al.

(10) Patent No.: US 6,336,752 B1
(45) Date of Patent: Jan. 8, 2002

(54) DUAL MOTOR RECIPROCATING BELT SHUTTER

(75) Inventors: Harvey L. Balopole; Victor Frampton, both of Huntington; Anthony Langella, Port Jefferson Station; Bruce Mathews, Huntington, all of NY (US)

(73) Assignee: Lockheed Martin Corporation, Syosset, NY (US)

( * ) Notice: Subject to any disclaimer, the term of this patent is extended or adjusted under 35 U.S.C. 154(b) by 0 days.

(21) Appl. No.: 09/443,353

(22) Filed: Nov. 19, 1999

(51) Int. Cl.$^7$ .................................................. G03B 9/04
(52) U.S. Cl. ........................ 396/459; 396/469; 396/479
(58) Field of Search .......................... 396/459, 479–482, 396/469, 7, 11, 8

(56) References Cited

U.S. PATENT DOCUMENTS

| | | | | |
|---|---|---|---|---|
| 2,970,529 A | * | 2/1961 | Nieuwenhoven | 396/479 |
| 3,179,029 A | | 4/1965 | Vinten et al. | |
| 4,041,513 A | | 8/1977 | Kondo | 354/241 |
| 4,235,546 A | | 11/1980 | Woodfine | 354/244 |
| 4,415,251 A | | 11/1983 | Petersen | 354/230 |

\* cited by examiner

Primary Examiner—David M. Gray
(74) Attorney, Agent, or Firm—Sterne Kessler Goldstein & Fox P.L.L.C.

(57) ABSTRACT

A system and method are provided for exposing an imaging medium. The method uses a focal plane shutter system with two reversible motors controlled by a servo control processor. A belt connects the motors. One end of the belt is attached to a shaft of the first reversible motor. The other end of the belt is connected to a shaft of the second reversible motor. In the belt, there are a plurality of fixed width slits. The servo control processor selects one of the fixed width slits according to a desired exposure time setting. The two reversible motors move the belt during an imaging cycle. During the imaging cycle, the first motor winds the belt around its shaft. The second motor simultaneously unwinds the belt from around its shaft. The servo control processor controls the motors to accelerate the selected slit up to a constant imaging medium traversal speed. The constant traversal speed is also determined by the desired exposure time setting. The selected slit is traversed across the imaging medium at the constant imaging medium traversal speed. After fully exposing the imaging medium, the selected slit is decelerated to a resting position. Motor direction is reversed for both motors in the next imaging cycle. The sequence of accelerating the selected slit, traversing the imaging medium at constant speed, decelerating the selected slit, and reversing the motors, is repeated until a new slit is selected.

26 Claims, 7 Drawing Sheets

DUAL MOTOR RECIPROCATING BELT SHUTTER

BACKGROUND OF THE INVENTION

1. Field of the Invention

This invention relates to imaging apparatus. More particularly, the invention relates to focal plane shutter systems.

2. Related Art

Fast shutter speeds in cameras that expose onto a large imaging medium are typically obtained with focal plane shutters. A typical application for focal plane shutters is in airborne reconnaissance. Military reconnaissance cameras collect continuous, overlapping frames of imagery from a moving aircraft. Reconnaissance missions require exposure times as short as $1/5000$th of a second. High frame repetition rates, from one to six exposures per second, are needed in airborne reconnaissance to obtain continuous imagery.

The imaging medium used with a focal plane shutter may be film or any form of light-sensitive electronic detector, such as a charge coupled device. Imaging media ranging in size from 25 mm by 35 mm up to 9 inches square are typical. Conventional focal plane shutters achieve exposure by moving a slit shaped opening over the imaging medium. The slit, generally rectangular, is moved in the direction of its width. The slit is long enough to expose the imaging medium completely. When the slit completes its traversal across the medium, full exposure is achieved.

The exposure time of a focal plane shutter is determined by the ratio of slit width to slit traversal speed. For example, a desired exposure time of $1/3000$ of a second using a 0.1 inch wide slit requires a constant imaging medium traversal speed of 300 inches per second. Accurate exposure time is an important consideration in reconnaissance and other applications. Reliability of the focal plane shutter is also of critical importance, particularly in military applications. High acceleration forces are needed to move a slit from an initial resting position up to a fast slit speed. The required forces create wear and tear in the shutter mechanism. This causes reliability problems in conventional focal plane shutters after extended use. Conventional cameras which operate at high frame repetition rates (more than one frame per second) for extended periods require frequent repair or replacement of the shutter.

Some conventional focal plane shutters use a complex dual belt arrangement to achieve multiple slit widths. An example of this is described in U.S. Pat. No. 3,179,029 to C. Vinton et al., Apr. 20, 1965. In such shutter mechanisms, two belts are driven in constant rotation past an imaging medium. The belts each have one or more slits. Exposure requires that a slit in one belt overlap with a slit in the other belt. This configuration admits light to the imaging medium when the overlapped slits pass over the medium. By controlling the degree of overlap of the slits, the exposure is controlled. Focal plane shutters of this type have problems with accuracy and reliability. When slit widths must be narrow (less than 0.1 inch), the inability to accurately position multiple belts relative to each other can cause errors in slit overlap, leading to errors in exposure. Moreover, collision between slit edges during reset operation is a common cause of failure in conventional designs.

Another problem with conventional overlapping belt shutter systems is that too much time is required to switch from a long exposure to a short exposure. During the time taken to adjust the amount of slit overlap, conventional shutter systems are unable to continue imaging. For imaging applications such as military reconnaissance, continuous imaging at high repetition rates is essential.

Hence there is a need for a focal plane shutter system that allows rapid changes in exposure, permits precise control of exposure, and is not prone to excessive wear.

SUMMARY OF THE INVENTION

According to the present invention, a system and method are provided for exposing an imaging medium. The method uses a focal plane shutter system with two reversible motors controlled by a servo control processor. A belt connects the motors. One end of the belt is attached to a shaft of the first reversible motor. The other end of the belt is connected to a shaft of the second reversible motor. In the belt, there are a plurality of fixed width slits. The servo control processor selects one of the fixed width slits according to a desired exposure time setting. The two reversible motors move the belt during an imaging cycle. During the imaging cycle, the first motor winds the belt around its shaft. The second motor simultaneously unwinds the belt from around its shaft while controlling belt tension. The servo control processor controls the motors to accelerate the selected slit up to a constant imaging medium traversal speed. The constant traversal speed is also determined by the desired exposure time setting. The selected slit is traversed across the imaging medium at the constant imaging medium traversal speed. After fully exposing the imaging medium, the selected slit is decelerated to a resting position. Motor direction is reversed for both motors in the next imaging cycle. The sequence of accelerating the selected slit, traversing the imaging medium at constant speed, decelerating the selected slit, and reversing the motors, is repeated until a new slit is selected.

FEATURES AND ADVANTAGES OF THE INVENTION

The present invention provides solutions to the problems associated with conventional focal plane shutter systems and methods.

The invention advantageously avoids the reliability problems associated with wear and tear in conventional shutter mechanisms. This is accomplished by using several fixed width slits. The present invention selects an appropriate slit to move back and forth past the image medium. Slits are selected to lessen the high acceleration forces which cause reliability problems in conventional systems. At the same time, the present invention is able to provide increased accuracy over conventional systems which use overlapping belts to vary slit width. Rather than using overlapping belts, the present invention uses fixed width slit selection. Therefore, the present invention does not suffer any loss in accuracy due to difficult belt alignment problems as do conventional systems. Since the present invention is accomplished using only a single belt, conventional problems caused by collision between slit edges are avoided. This adds to the improved reliability of the present invention over conventional systems.

Further features and advantages of the invention, as well as the structure and operation of various embodiments of the invention, are described in detail below with reference to the accompanying drawings.

BRIEF DESCRIPTION OF FIGURES

The present invention will be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

A preferred embodiment of the present invention is now described with reference to the figures. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

I. Overview

Figure 1:
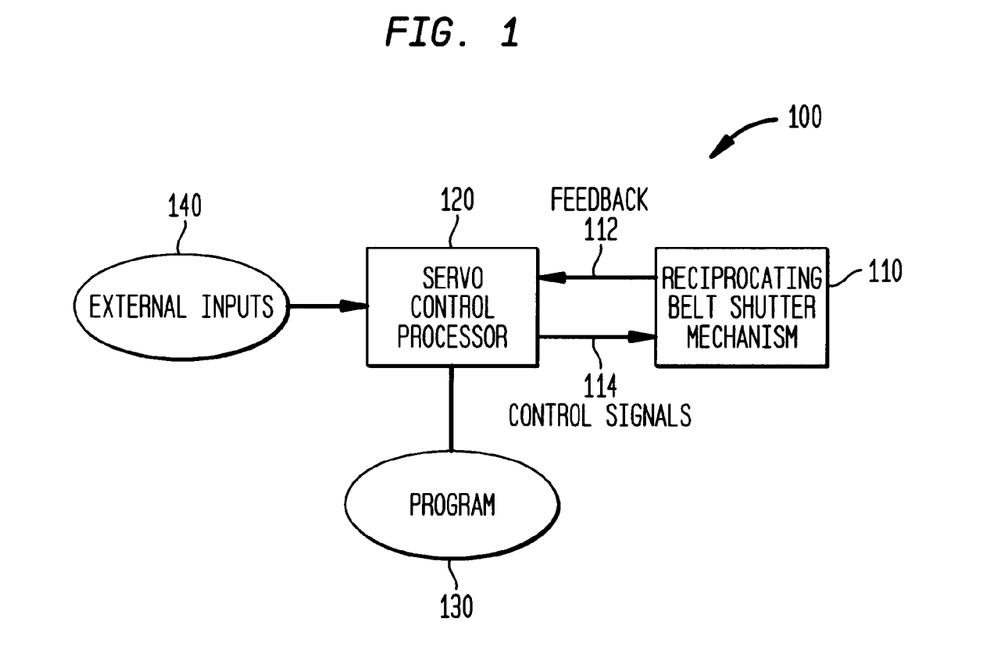
FIG. 1 shows a block diagram of the dual motor reciprocating belt shutter system, according to an embodiment of the invention.

FIG. 1 is a block diagram of one embodiment of the present invention. A focal plane shutter system 100 includes a reciprocating belt shutter mechanism 110, a servo control processor 120, a program 130, and external inputs 140. Servo control processor 120 can be any commercially available microprocessor with peripheral circuitry. Servo control processor 120 can also be any suitable application specific integrated circuit (ASIC) or other control circuitry. Servo control processor 120 controls the operation of reciprocating belt shutter mechanism 110 using control signals 114. Control is based on calculations performed by execution of program 130. Program 130 operates on data provided by feedback signals 112 from reciprocating belt shutter mechanism 110. Feedback signals 112 include information regarding slit position and motor current.

Program 130 also operates on data provided as external inputs 140. External inputs 140 include data entered manually into servo control processor 120 through an input/output (I/O) device, such as a keyboard or control panel. Manually entered data may include a exposure time setting and/or an exposure repetition rate. The exposure time setting represents the amount of time that any given point of the imaging medium is exposed to light. Manually entered data may also include any information supplied by a user of system 100.

External inputs 140 can also include external condition parameters representing sensed external conditions, e.g., lighting conditions, speed of the imaging platform, or other data relevant to determining an exposure time setting. Data representing flight condition parameters can be used to determine an appropriate exposure time setting. Data representing sensed external conditions is automatically inputted into servo control processor 120. Servo control processor 120 can simultaneously receive inputs entered manually and inputs representing sensed external conditions. In the event of a conflict, manually entered data overrides data entered automatically.

II. Reciprocating Belt Shutter Mechanism

Figure 2A:
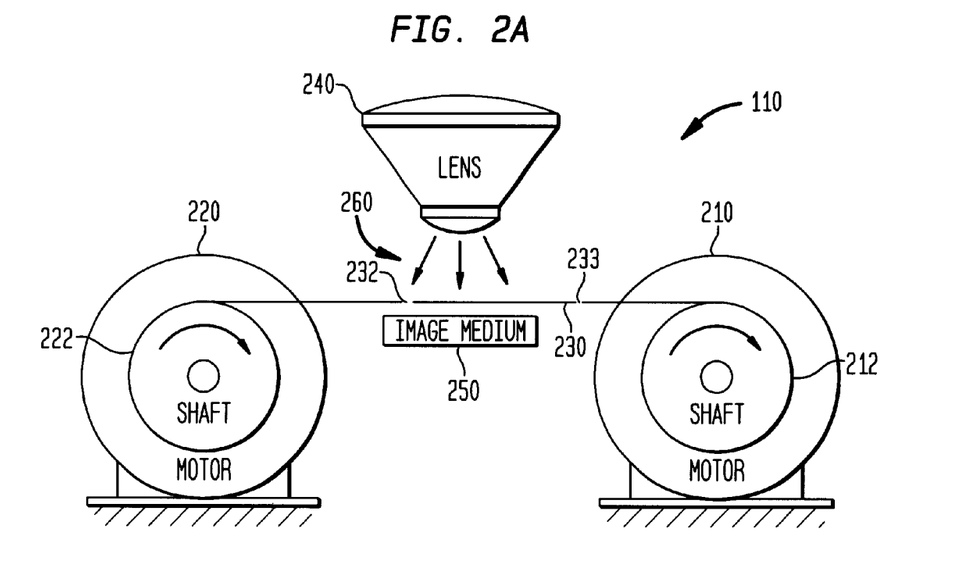
FIGS. 2A and 2B illustrate an embodiment of the reciprocating belt shutter mechanism of FIG. 1.
Figure 2B:
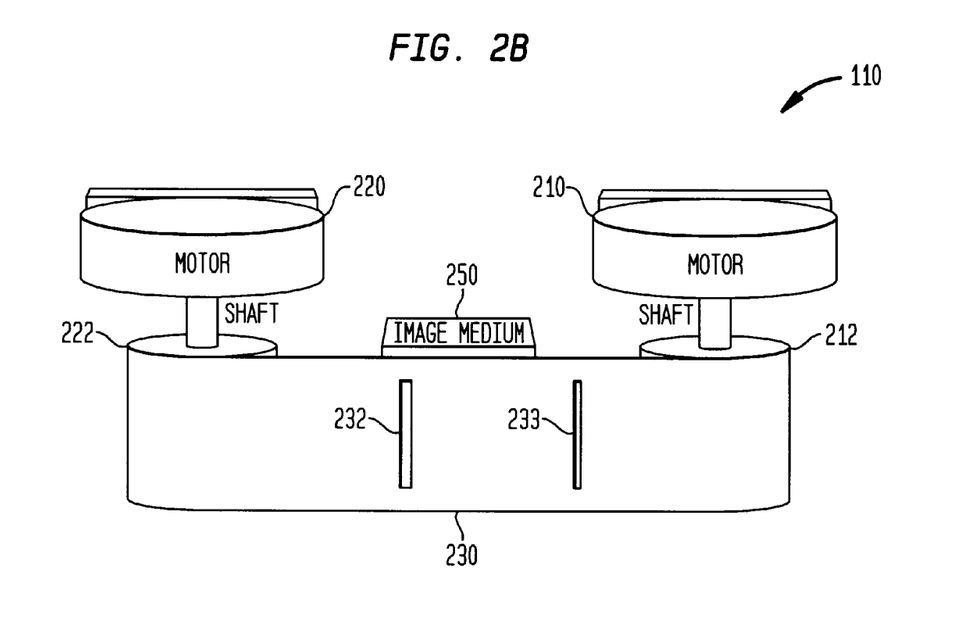

FIGS. 2A and 2B are two views of a reciprocating belt shutter mechanism 110. Mechanism 110 includes a reversible motor 210, a motor shaft 212, a reversible motor 220, a motor shaft 222, and a belt 230 having fixed width slits 232 and 233. Belt 230 is typically constructed from stainless steel or another suitable material. One end of belt 230 is connected to shaft 212. The other end of belt 230 is connected to shaft 222. Belt 230 is longer than the distance between shafts 212 and 222. In particular, the length of belt 230 is determined by the distance between the motor shafts 212 and 222, the number of slits, the desired spacing between slits, and the desired length of any leader or trailer of the belt (not shown). The belt is wound on motor shafts 212 and 222. Servo control processor 120 maintains tension on the belt by adjusting motor current. Tension is maintained in belt 230 by winding any excess length around shaft 212 and/or shaft 222. Mechanism 110 is not limited to having two fixed width slits in belt 230. For example, in another embodiment, belt 230 can have three or more fixed width slits. In one embodiment, each slit has a different width.

An imaging medium 250 is disposed behind belt 230. Motors 210 and 220 drive belt 230 back and forth, to repeatedly move one of the slits back and forth past imaging medium 250. Motors 210 and 220 can be any suitable commercially available motors. Lens system 240 focuses light 260 that has impinged on mechanism 110. If belt 230 is properly positioned, light 260 passes through a slit (such as slit 232) and exposes imaging medium 250. When none of the slits are in front of imaging medium 250, no exposure takes place. Exposure of imaging medium 250 only occurs during traversal of imaging medium 250 by one of the slits.

FIGS. 2A and 2B arbitrarily show fixed width slit 232 traversing imaging medium 250. Slit selection is made by servo control processor 120 based on inputs 140. A specific slit is chosen in order to achieve a desired exposure time. The exposure time is the ratio of slit width to slit speed during imaging medium traversal. This ratio must be constant during imaging medium traversal to maintain consistent exposure of all portions of imaging medium 250. By selecting from among alternative slits having different widths, exposure times of imaging medium 250 can be varied. Selecting between alternative slits also limits the necessary range of belt speeds. By choosing the proper slit, servo control processor 130 can minimize the variance in speeds imposed on motors 210 and 220, and on belt 230.

Motor 220 sets belt 230 (and slit 232) in motion by turning motor shaft 222 so as to wind belt 230 around shaft 222. As a result, slit 232 moves from right to left in the illustrated embodiment, accelerating from rest to a constant speed for traversal of imaging medium 250. Slit 232 does not pass in front of imaging medium 250 until slit 232 has reached the constant traversal speed. The distance between slits, known hereinafter as the belt segment, must be at least the sum of the length of the imaging medium and the acceleration length, where the acceleration length is the distance the belt must travel to accelerate a slit from rest up to traversal speed. While slit 232 moves across imaging medium 250, light 260 passes through slit 232 to expose imaging medium 250. Since the invention uses fixed width slits, the ratio of slit width to slit speed during traversal is determined by traversal speed. Therefore, consistent exposure of imaging medium 250 requires that traversal speed be maintained constant. After slit 232 has finished moving across imaging medium 250, belt 230 decelerates to a resting position. The sequence of acceleration, traversal, and deceleration is known as an imaging cycle.

If fixed width slit 232 remains selected and additional imaging is necessary, motor 210 sets belt 230 (and slit 232) in motion by turning motor shaft 212 so as to wind belt 230 around shaft 212. As a result, slit 232 moves from left to right in the illustrated embodiment, accelerating slit 232 from rest to a constant speed for traversal of imaging medium 250. Slit 232 traverses imaging medium 250 in the opposite direction of its previous traversal, then decelerates to a resting position. This second sequence of acceleration, traversal, and deceleration constitutes a second imaging cycle. Slit 232 continues to pass back and forth across imaging medium 250 as long as slit 232 is selected. Note that as shaft 212 winds belt 230, belt 230 necessarily unwinds from shaft 222, and vice versa.

Figure 2C:
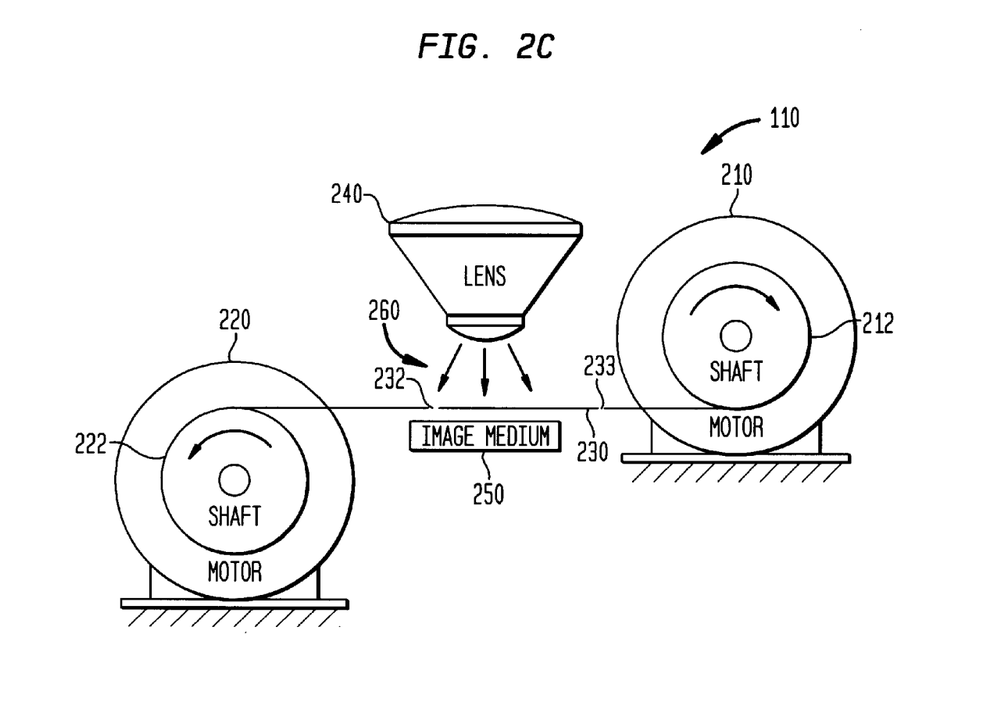
FIGS. 2C and 2D illustrate an alternative embodiment of the reciprocating belt shutter mechanism of FIG. 1.
Figure 2D:
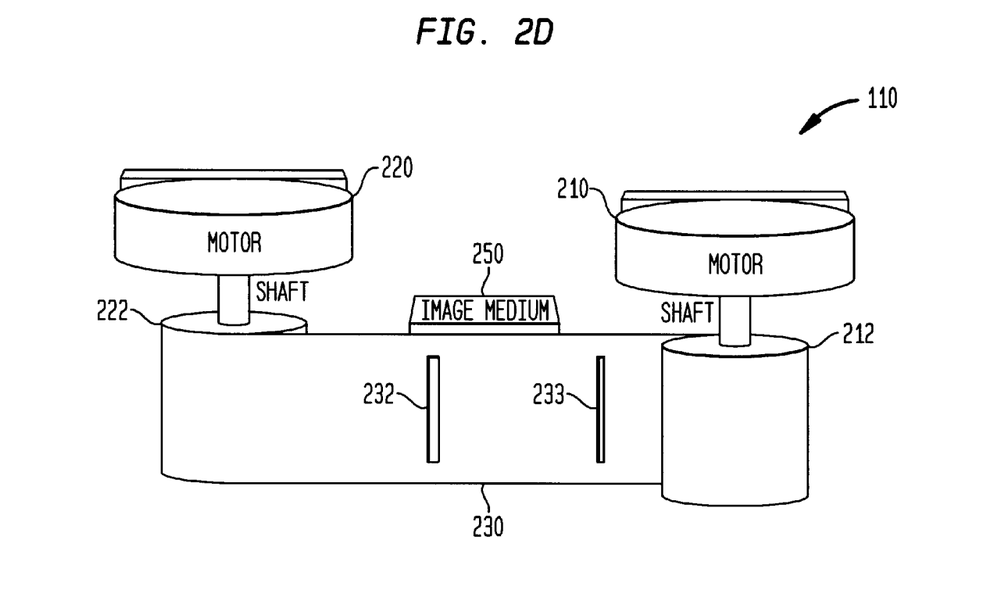

An alternative embodiment to the one shown in FIGS. 2A and 2B is an inertia canceling configuration, depicted in FIGS. 2C and 2D. Here, motor 210 and shaft 212 are repositioned such that motor 210 and shaft 212 rotate in the opposite direction of motor 220 and shaft 222 during belt travel. As illustrated in FIG. 2C, if shaft 222 moves counterclockwise, then shaft 212 moves clockwise, and vice versa. This arrangement serves to cancel inertia during acceleration and deceleration of the belt and therefore improves the stability of mechanism 110.

Figure 3A:
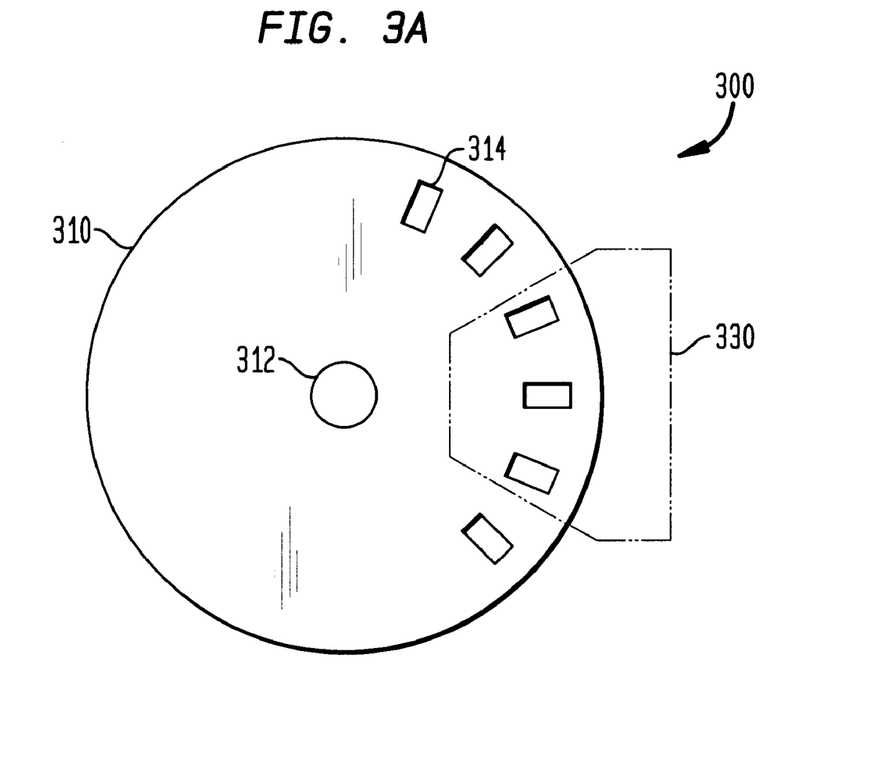
FIGS. 3A and 3B illustrate a mechanism for providing slit position feedback to the servo control processor of FIG. 1.
Figure 3B:
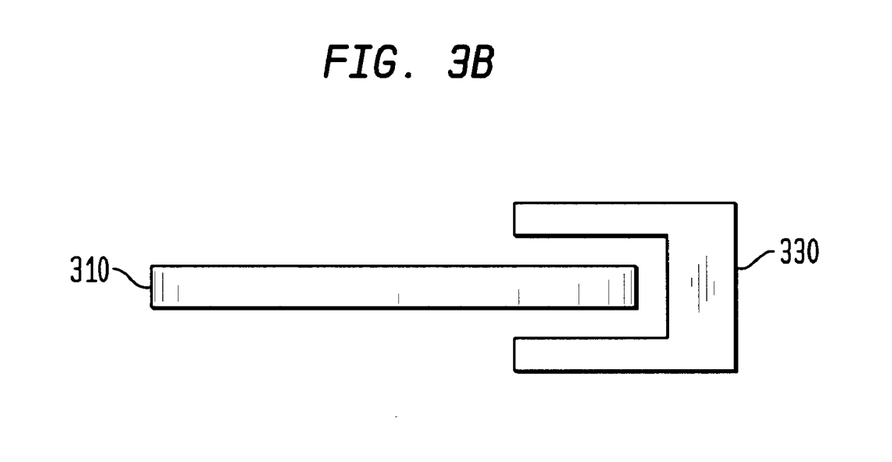

FIGS. 3A and 3B show top and side views of an exemplary encoder 300, used for providing slit position feedback to servo control processor 120 according to an embodiment of the invention. Encoder 300 includes a code wheel 310 containing a plurality of markers 314. Encoder 300 also includes an optical reader 330. Code wheel 310 includes a center 312 for mounting centrally to either of shafts 212 or 222. In an alternative embodiment, code wheel 310 can be coupled to either of shafts 212 or 222 through a gear mechanism. In either case, as belt 230 moves around shafts 212 and 222, code wheel 310 revolves. Reader 330 detects the position of code wheel 310 by optically detecting which of the markers 314 is currently positioned in reader 330. The position of code wheel 310 correlates to the position of belt 230 and, by extension, to the positions of slits 232 and 233. Reader 330 therefore detects slit position, and feeds this slit position information back to servo control processor 120. Code wheels and readers are commercially available, and their use is well known in the relevant art.

Figure 4:
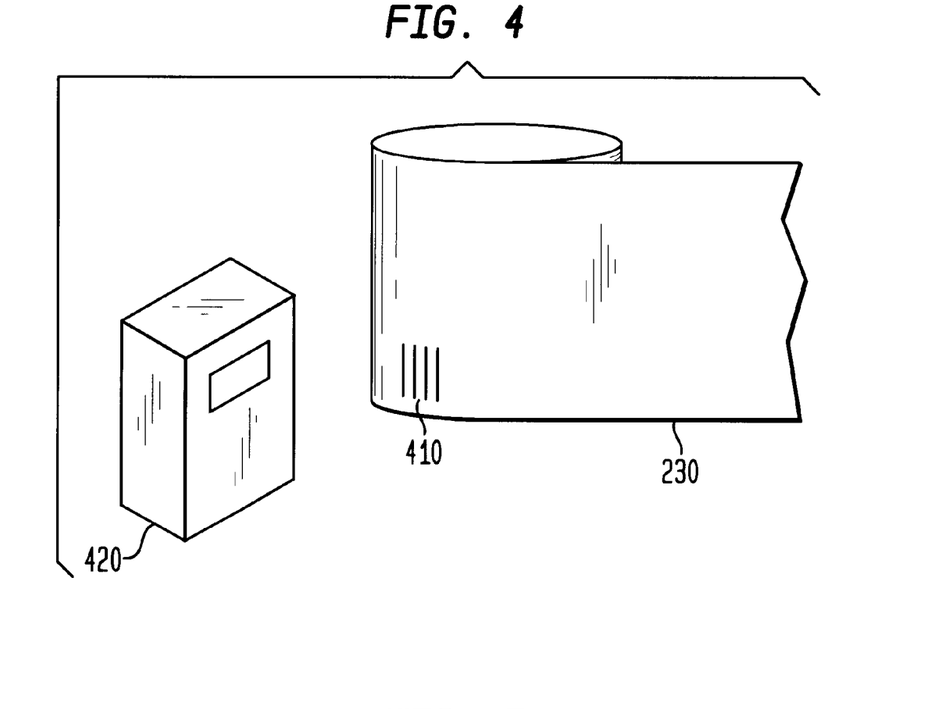
FIG. 4 illustrates an alternative mechanism for providing slit position feedback to the servo control processor of FIG. 1.

FIG. 4 shows an alternative embodiment in which slit position is detected optically through detectable markings on belt 230. In this embodiment, belt 230 contains lines that serve as detectable markings 410. Detectable markings 410 may be painted on or etched into belt 230. As detectable markings 410 move along with belt 230, a reader 420 detects the position of the belt and therefore detects slit position. Reader 420 then sends slit position feedback data to servo control processor 120. Reader 420 is any commercially available device for reading such lines, such as a bar code reader.

Figure 5:
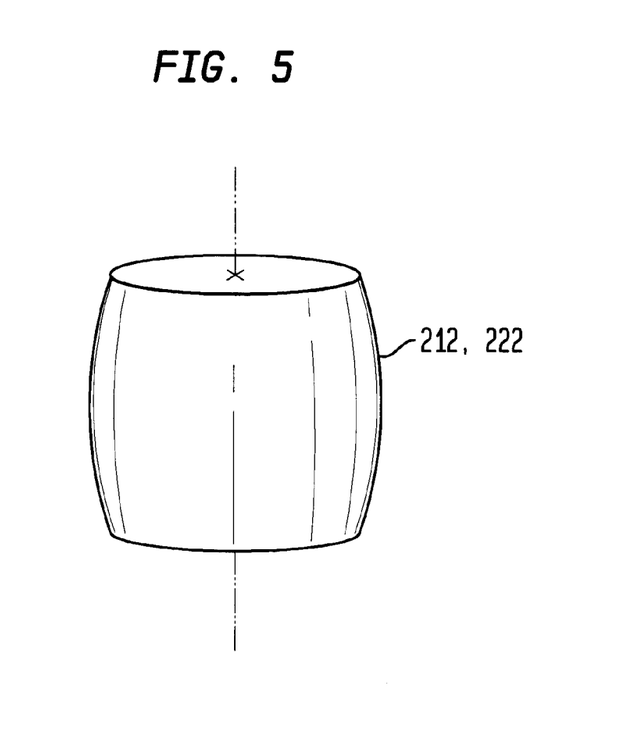
FIG. 5 illustrates a shape for the shafts of FIGS. 2A and 2B.

FIG. 5 shows a shape which can be used for motor shafts 212 and 222 in an embodiment of the invention. The exterior portion of each motor shaft is convexly shaped. The shaft exterior contacts the belt (not shown) and, because of the convex shape, keeps the belt from slipping from motor shafts 212 and 222 after repeated operation.

A fixed amount of tension is maintained in belt 230 during slit acceleration, traversal, and deceleration. Because the tension is constant, belt 230 remains taut. Because the tension never exceeds a predetermined level, belt 230 does not stretch or break. Tension is maintained by controlling the amount of current applied to each of the motors 210 and 220. Controlling the amount of current to each motor controls the amount of torque at each motor. Consequently, an appropriate amount of tension is maintained in belt 230. The amount of current supplied to motors 210 and 220 is controlled by servo control processor 120. The differential in current supplied to motors 210 and 220 is monitored by servo control processor 120 in order to monitor and maintain the tension in belt 230.

Figure 6:
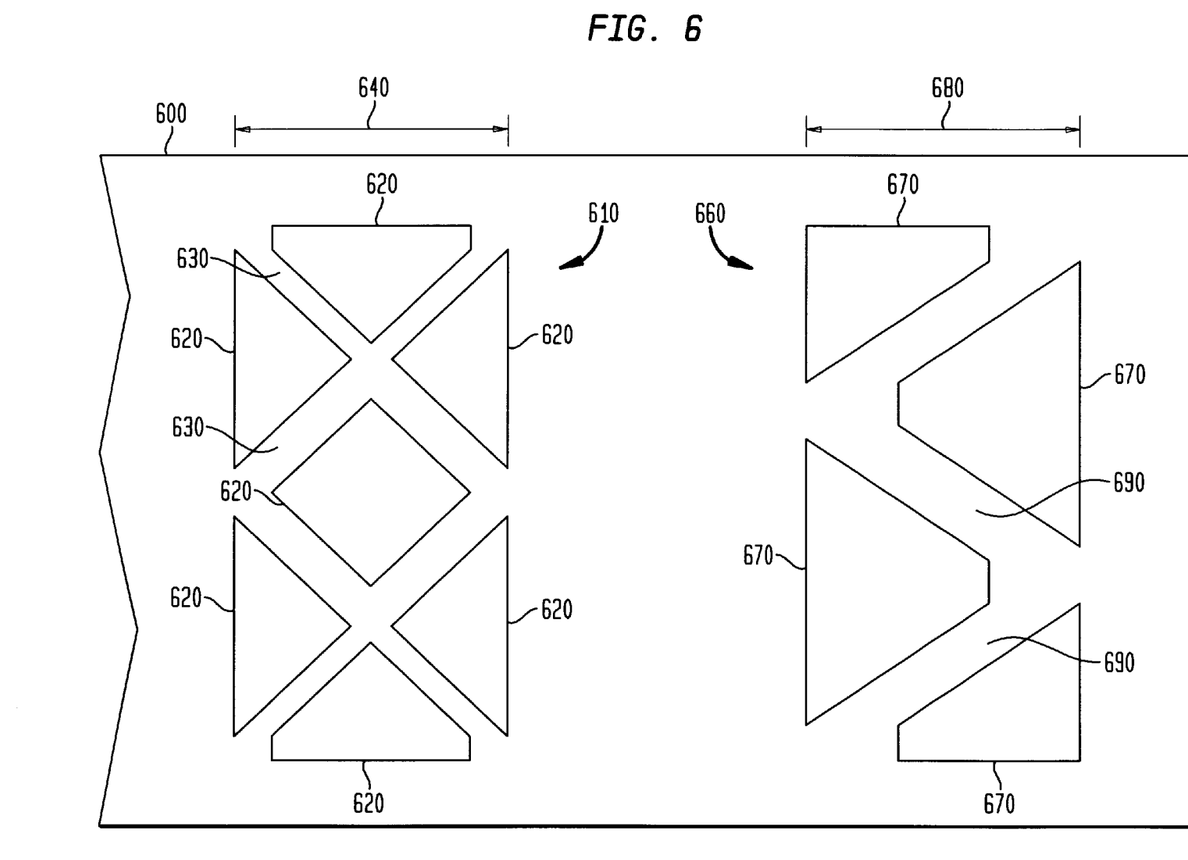
FIG. 6 illustrates two patterns that can be used for the slits of the belt.

While a slit may be shaped as a simple rectangle as shown in FIGS. 2A through 2D, a slit can alternatively be formed as a pattern of openings. FIG. 6 shows a belt 600 with two alternative slit patterns 610 and 660. Slit patterns can be created by removing portions of belt 600 to form patterns such as 610 and 660. In alternative embodiments, other patterns may be used. Portions of belt 600 can be removed by precision machining, chemical reaction, or other suitable removal processes. This results in openings 620. In the case of pattern 610, after removing portions from belt 600, the remaining belt material forms supporting legs 630. Light can be transmitted through openings 620, to expose the imaging medium during imaging medium traversal. Likewise, to create pattern 660, portions of belt 600 are removed to create openings 670. Supporting legs 690 remain. Supporting legs 630 and 690 are residual portions of belt 600 that limit flexing of belt 230 in regions around slit patterns 610 and 660, respectively. This helps to prevent failure of belt 600 due to mechanical stress.

Note that in order to assure consistent exposure of an imaging medium, any slit pattern must be shaped so that, given a constant traversal speed, any point on the imaging medium is exposed for the same amount of time as any other point. This requirement is satisfied if any line segment drawn longitudinally in the direction of the belt from one side of the pattern to the other (a distance 640 in pattern 610, and a distance 680 in pattern 660) crosses the same amount of open area as any other such line segment drawn across the pattern. This assures that, as the slit pattern passes over the imaging medium, every point on the imaging medium is exposed for the same amount of time.

III. Process

Figure 7:
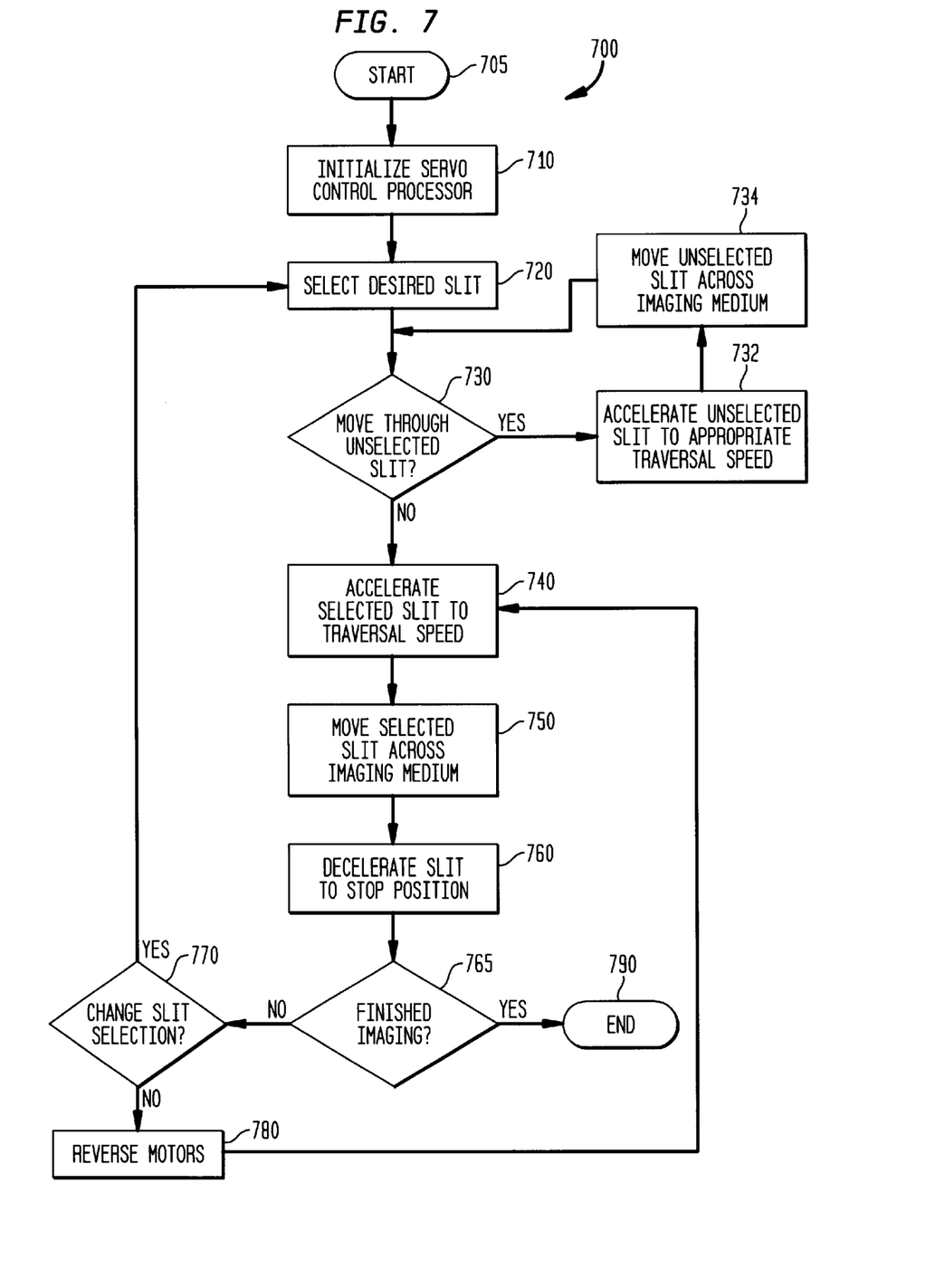
FIG. 7 is a flowchart illustrating the process of an embodiment of the invention.

A flowchart of a method of operating a focal plane shutter system according to an embodiment of the invention is shown in FIG. 7. The process begins with a step 705. At a step 710, the servo control processor is initialized with a variety of inputs. Typical initial inputs to the servo control processor can include the current slit positions relative to the imaging medium, the number of traversals of the imaging medium per second (exposure repetition rate), and sensed external conditions.

Based on inputs to the servo control processor, the servo control processor derives a required exposure time setting. As a result, one of the slits is selected at step 720. Greater exposure time generally requires a wider slit and/or a slower traversal speed. Judicious selection from among alternative slits also limits the necessary range of belt speeds. By choosing the proper slit, the servo control processor can minimize the variance in belt speeds imposed on the motor.

At a step 730, the servo control processor determines whether an unselected slit must pass the imaging medium before the selected slit is positioned to begin an imaging cycle. When a slit is selected, the motor moves the belt to position the selected slit for imaging medium traversal. This could unintentionally cause an unselected slit to move across the imaging medium. If the servo control processor determines that the selected slit can be reached without switching through an unselected slit, then control passes to a step 740, where an imaging cycle begins.

Initially, the selected slit is positioned at a specific linear distance from the edge of the imaging medium. This linear distance is the acceleration distance. The servo control processor calculates an acceleration necessary to bring the selected slit up to traversal speed within the acceleration distance. Using this belt acceleration calculation, the servo control processor determines the current to be supplied to the motors. Note that current is provided to one motor to enable the motor to wind the belt and accelerate the slit. A different amount of current is provided to the second motor in order to maintain proper belt tension. To determine the current to be supplied to the motors, the servo control processor may use a control profile. A control profile comprises predetermined information for providing motor current corresponding to a desired acceleration. As the servo control processor continues to receive feedback, the servo control processor provides adaptive control of the motors. The servo control processor compares slit position feedback to the required slit position. The servo control processor then controls current to the motors based on this comparison. This adaptive control of current to the motors serves to control slit acceleration, imaging medium traversal speed, and slit deceleration.

Note that in order to move the belt at a desired linear speed, the rotational speed of a motor (as measured, for example, in revolutions per minute) must also vary with the amount of the belt currently spooled on the associated motor shaft. As the amount of the belt that is spooled on the motor shaft grows, the motor must turn more slowly to compensate for the increase in the effective radius of the motor shaft. Hence, when the servo control processor determines the amount of current to be sent to the motors, the amount of the belt that is spooled on the respective motor shafts must be considered. The amount of the belt that is spooled on the respective motor shafts can be inferred from the current belt position. The current belt position is determined in the manner described above with respect to FIGS. 3A, 3B, and 4.

At a step 750, the selected slit moves across the imaging medium. By this point, the selected slit has been accelerated up to the imaging medium traversal speed dictated by the exposure time setting. The slit has traveled the necessary acceleration distance to reach this speed from its resting position. It is important that the traversal speed be maintained during the entire traversal of the imaging medium. Otherwise, inconsistent exposure would result. The servo control processor regulates current to the motors for maintaining a constant traversal speed.

At a step 760, the selected slit is decelerated to a rest position through the acceleration/deceleration distance. The servo control processor performs a belt deceleration calculation, to determine the deceleration necessary to bring the selected slit to rest. Proper deceleration is important to ensure that unselected slits do not accidentally expose the imaging medium. If the selected slit were not brought to rest in time, an unselected slit might unintentionally be moved in front of the imaging medium. Proper deceleration is also important to avoid wear on the belt that would be caused by sudden stopping. In an embodiment of the invention, the servo control processor can perform adaptive control throughout deceleration. The servo control processor can use a deceleration control profile for this purpose. The current to the motors is decreased according to profile information read by the servo control processor. Adjustments to the current can be made based upon comparisons between the required deceleration and the feedback signals. The servo control processor continuously compares the actual slit position to the required position. The servo control processor minimizes any difference between the required position and the actual position by adjusting the current to the motors.

If, at a step 765, it is determined that imaging is completed, then the process ends at a step 790. Otherwise, at a step 770, it is determined whether a new slit selection is needed for the next imaging cycle. A change in slit selection may be necessitated by changes in the sensed external conditions, such as lighting conditions, imaging platform speed, or other inputs relevant to exposure time setting. A change may also be entered manually by a user of the focal plane shutter system. If a change in slit selection is necessitated, then the process returns to step 720.

If no change in slit selection is required at step 770, then control passes to step 780, where the motors are each reversed so as to move the belt in the reverse direction. The motors may be accelerated using a control profile. The process continues with another imaging cycle at step 740, though the belt is now moving in a direction opposite to that of the previous imaging cycle. In this manner, the selected slit is moved back and forth past the imaging medium by alternating the rotational direction of the motors. This occurs repeatedly until imaging is completed in step 765 or a different slit is selected in step 770.

At step 730 it may be determined that an unselected slit needs to be moved past the imaging medium. This might be required in order to position a newly selected slit for the beginning of an imaging cycle. If an unselected slit were to traverse the imaging medium at the wrong speed, an exposure error would occur. The medium could be underexposed or overexposed. The embodiment of the present invention illustrated in FIG. 7 provides a method whereby an unselected slit may be moved past the imaging medium without sacrificing an imaging cycle. This is accomplished by steps 732 and 734. At step 732, the belt (and the unselected slit) is accelerated in the appropriate direction up to a traversal speed calculated by the servo control processor. The servo control processor calculates the traversal speed by evaluating the ratio of the unselected slit's width to the desired exposure time. At step 734, the servo control processor controls current to the motors to maintain this traversal speed during image medium traversal. As in steps 740 and 750, the servo control processor may use a control profile. The servo control processor can adaptively control acceleration, traversal, and deceleration of the unselected slit based on the feedback signals. If additional unselected slits must pass the imaging medium, steps 730, 732 and 734 are repeated until it is no longer necessary to move any unselected slits past the imaging medium. Control then passes to step 740, where the selected slit is accelerated to traversal speed.

III. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A focal plane shutter system for providing exposure of an imaging medium, comprising:
   a belt having a plurality of fixed width slits therein;
   a first reversible motor for winding said belt around a shaft of said first motor during an imaging cycle; and
   a second reversible motor for unwinding said belt from said shaft of said first motor during a subsequent imaging cycle.

2. The focal plane shutter system of claim 1, further comprising means for tracking positions of said fixed width slits relative to the imaging medium.

3. The focal plane shutter system of claim 2, wherein said tracking means includes an encoder mounted on said shaft of either said first reversible motor or said second reversible motor.

4. The focal plane shutter system of claim 2, wherein said tracking means includes detectable markers in said belt.

5. The focal plane shutter system of claim 1, further comprising a servo control processor coupled to said first reversible motor and said second reversible motor for controlling movement of said belt relative to the imaging medium.

6. The focal plane shutter system of claim 5, wherein said servo control processor is programmed to select one of said plurality of fixed width slits and a constant traversal speed for moving said selected fixed width slit past the imaging medium according to a desired exposure time setting.

7. The focal plane shutter system of claim 6, wherein said servo control processor is programmed to control current to said first motor and said second motor to maintain said constant traversal speed while moving said selected fixed width slit past the image medium.

8. The focal plane shutter system of claim 7, wherein said servo control processor is programmed to perform belt acceleration calculations and belt deceleration calculations.

9. The focal plane shutter system of claim 8, wherein said servo control processor is programmed to control current to said first motor and said second motor according to said belt acceleration calculations and said belt deceleration calculations.

10. The focal plane shutter system of claim 8, wherein said belt acceleration calculations and said belt deceleration calculations are based on said constant traversal speed, an exposure repetition rate, and slit position feedback.

11. The focal plane shutter system of claim 6, wherein said servo control processor is programmed to control switching through an unselected slit by causing said unselected slit to traverse the imaging medium at a speed corresponding to said exposure time setting.

12. The focal plane shutter system of claim 6, wherein said exposure time setting comprises manually inputted data.

13. The focal plane shutter system of claim 6, wherein said servo control processor is programmed to automatically calculate said exposure time setting based upon data corresponding to sensed external condition parameters.

14. The focal plane shutter system of claim 13, wherein said sensed external condition parameters comprise flight condition parameters.

15. The focal plane shutter system of claim 5, wherein said servo control processor is programmed to control reversal of said first motor and said second motor.

16. The focal plane shutter system of claim 5 wherein said servo control processor is programmed to monitor a differential in current drawn by said first motor and said second motor and to adjust said differential in current to control tension in said belt.

17. The focal plane shutter system of claim 1 wherein at least one of said fixed width slits comprises a pattern of removed portions of said belt and supporting legs formed from residual portions of said belt.

18. The focal plane shutter system of claim 1 wherein said shaft of said first motor and said shaft of said second motor are convexly shaped for maintaining the position of said belt.

19. The focal plane shutter system of claim 1 wherein said shaft of said first motor and said shaft of said second motor rotate in the same direction during said imaging cycle.

20. The focal plane shutter system of claim 1 wherein said shaft of said first motor and said shaft of said second motor rotate in opposite directions during said imaging cycle.

21. A camera for providing exposure of an imaging medium, comprising:
   a lens system;
   a belt having a plurality of fixed width slits therein;
   a first reversible motor for winding said belt around a shaft of said first motor during an imaging cycle; and
   a second reversible motor for unwinding said belt from a shaft of said first motor during a subsequent imaging cycle.

22. A method of exposing an imaging medium using a focal plane shutter system having a belt with a plurality of fixed width slits therein, a first reversible motor, and a second reversible motor, the method comprising the steps of:
   selecting a fixed width slit to traverse the imaging medium during a first imaging cycle;
   winding the belt around a shaft of the first motor while the selected fixed width slit traverses the imaging medium during the first imaging cycle; and
   unwinding the belt from the shaft of the first motor while the selected fixed width slit traverses the imaging medium during a subsequent imaging cycle.

23. The method of claim 22, wherein said selecting step includes selecting a fixed width slit according to a desired exposure time setting.

24. The method of claim 22, wherein said winding step comprises the steps of:
   accelerating the selected fixed width slit from a standstill up to a constant speed during the first imaging cycle; and
   decelerating the selected fixed width slit down from the constant speed to a standstill during the first imaging cycle.

25. The method of claim 22, wherein said unwinding step comprises the steps of:
   reversing the first motor and the second motor;
   accelerating the selected fixed width slit from a standstill up to the constant speed during the subsequent imaging cycle;
   traversing the selected fixed width slit across the imaging medium at the constant speed during the subsequent imaging cycle; and
   decelerating the selected fixed width slit from the constant speed down to a standstill during the subsequent imaging cycle.

26. The method of claim 22, further comprising the steps of:
   selecting a second fixed width slit to traverse the imaging medium at a second constant speed during a further imaging cycle;
   accelerating the second fixed width slit from a standstill up to the second constant speed during the further imaging cycle;
   traversing the second fixed width slit across the imaging medium at the second constant speed during the further imaging cycle; and
   decelerating said second fixed width slit from the second constant speed down to a standstill during the further imaging cycle.

* * * * *